Figure 1:
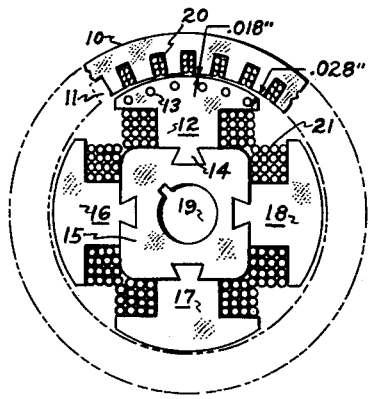

June 27, 1961 L. W. THOMPSON 2,990,508

SYNCHRONOUS ALTERNATOR SYSTEM

Filed Dec. 10, 1956

Inventor
Louis W. Thompson,
by
His Agent.

United States Patent Office 2,990,508
Patented June 27, 1961

2,990,508
SYNCHRONOUS ALTERNATOR SYSTEM
Louis W. Thompson, Schenectady, N.Y., assignor to Fidelity Electric Company, Inc., Lancaster, Pa.
Filed Dec. 10, 1956, Ser. No. 627,488
8 Claims. (Cl. 322—25)

This invention relates to improvements in alternating-current supply systems, more particularly to improvements in a self-exciting and self-regulating synchronous alternator system, and is a continuation in part of my pending application bearing the Serial Number 540,210, filed on October 13, 1955, now abandoned, and is assigned to the same assignee.

During the past half century or more of synchronous alternator practice, certain traditional principles and practices have been established that have seriously handicapped the development of these machines for wider usefulness. It is the general object of this invention, therefore, to free the art from these limitations and extend the usefulness of these machines to a wider range of purposes.

One of the traditional concepts for such systems has been the implicit assumption that load variations are slow in rate and narrow in range. Generators constructed along these ideas are inadequate for rapidly and widely fluctuating loads, such as those encountered in agricultural service, e.g., a tractor-mounted alternator supplying the electric motor of a hay baler. This inadequacy shows itself in the stalling of motors and severe impairment of lighting under the overload surges of a service the average value of which is well within the continuous rating of the machine.

It is an object of the present invention, therefore, to provide a synchronous alternator system that is fully adequate to supply a highly fluctuating load without a proportionate increase in size.

As alternating current system are generally classified as "constant potential" types, it is standard practice to regulate the voltages of these systems in their guaranteed load ranges, and the maximum available field excitation for the machines is thus limited.

It is another object of the present invention, therefore, to make available to these machines high exciting-current surges so as to enable them to supply high over-load-current surges.

It is well known in the industry that the larger the air gap of a synchronous machine, the smaller is its synchronous reactance and the more constant its terminal voltage under varying loads, and it is a design maxim to err on the side of a larger air gap. This, however, greatly increases the field excitation necessary for the design flux and leads to a larger and costlier machine.

It is another object of the present invention, therefore, to provide a synchronous machine that is substantially smaller, more economical and more portable by the use of minimal air gaps and other means, letting the normal operating reactance of the machine be what it may and reducing it by saturation where it is more likely to hurt the system performance, namely in the overload range.

Still another limitation of the conventional synchronous machines has been the difficulty of making them self-exciting with certainty, able to build up the desired system voltage unfailingly from the residual magnetic field left from a previous operation.

Therefore, still another object of the present invention is to provide, by simple and inexpensive means, a machine that will build up its voltage from its residual fields unfailingly.

Still other objects and advantages of the invention will be clear from the following description and explanations taken in connection with the accompanying drawings, and the novel features of the invention will be pointed out in the claims.

FIG. 1, drawn partially cut away and in section, illustrates the preferred magnetic structure of the synchronous alternator of the present invention.

Figure 2:
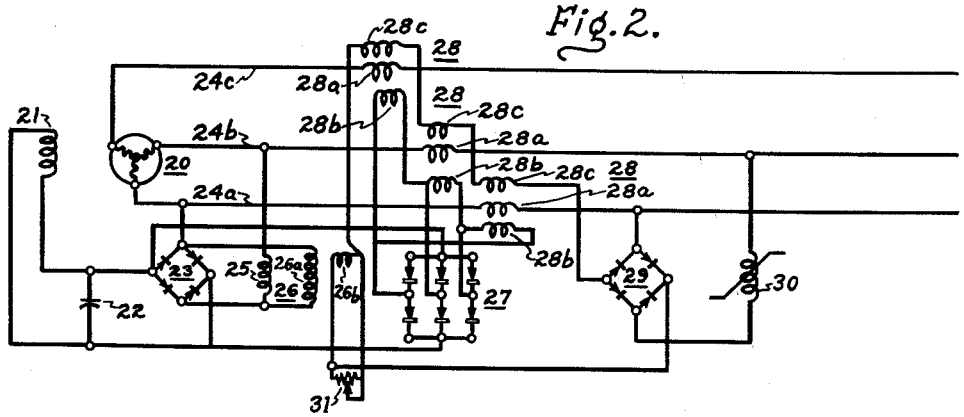
Figure 3:
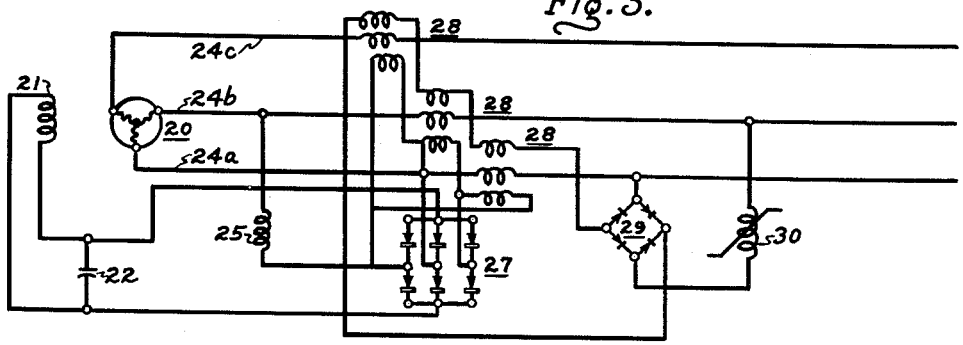

FIG. 2 is the diagrammatic representation of a preferred three-phase embodiment of the system of the present invention, and FIG. 3 is a simplified modification of FIG. 2.

It may be properly inferred from the foregoing introductory remarks that the major features of the invention include its performance outside its normal steady-state operation, including at one end of the operating range ability to build up its rated voltage with certainty from the residual field left from an earlier operation, and at the other end of the operating range, ability to deliver large overload surges beyond its maximum rated regulated-voltage load so as to prevent the stalling of motors and failure of other loads due to insufficient supply of current or voltage under those conditions.

It will be seen in what follows that the major factors in the first case include a small air gap, a magnetic structure that combines permanent magnet laminations with magnetically soft laminations, the use of the right kind of rectifiers, and a shunt excitation system with reserve capacity, the last one being provided for another purpose also as described below.

The principal factors in the second case, namely, adequacy of the machine to deliver large overload surges, will be seen below to include the novel means of (a) a capacitor connected in shunt with the exciting winding of the machine so as to enable the machine to admit of high overload current surges by responding to them instantaneously with the necessary surge of field excitation; and (b) provision for and method of control of reserve field excitation to be made available to the field winding under overload surges so as to raise the air gap voltage of the machine substantially and to reduce the normally high reactance of the machine to a fraction of that value by the stauration of the magnetic circuit of the machine, this excess excitation being applied synchronously with the overload-current surge.

Other features of construction, organization and operation of the system will be apparent as the description of the invention progresses.

Considering FIG. 1 now in greater detail, 10 is a portion of the conventional stator core of the synchronous generator with conventional slots 11 for stator- or armature-winding 20. Part 12, and similar parts 16, 17 and 18, are the magnetic poles of the machine shown here as a four-pole rotating-field machine, each one of the poles being embraced by a field winding 21. These poles have also slots 13 near the pole face to receive a damper winding. Each field pole is seen as having an end portion 14 keyed to an arbor 15 to hold the poles in proper alignment, 15 having an axial hole 19 to receive a shaft.

As in conventional practice, each pole is a stack of magnetic laminations; but contrary to conventional practice, a small group of the laminations of each pole, preferably not to exceed 10 percent of the total, are permanent magnet laminations, preferably magnetized in advance of assembly into the poles, but not necessarily so because the ampere turns of the field winding will magnetize them during the first operation of the machine in factory test, especially during the load surge tests.

Contrary to conventional practice is also the minimal air gap of the machine shown as 0.018 in. at the middle of the pole arc and as 0.028 in. near the pole tips to modify the flux distribution in the air gap for improved wave shape of the voltage. Such small gaps are conventionally considered as suitable for induction motors and inappropriate to synchronous machines, the latter being constructed with gaps at least several times as large in the smaller machines and still more in the larger. A minimal gap—that is, one limited by mechanical considerations alone—is particularly important in the present invention so as to realize the maximum possible benefit from the permanent magnet laminations, as otherwise, the larger the gap the larger will be the fraction of their flux leaking through adjoining laminations without crossing the air gap.

In FIG. 2, representing the organization and electrical connections of the various parts of the preferred embodiment of the invention, 20 represents the armature winding of the synchronous machine, shown as three-phase, and 21 is its field winding. The armature terminals are shown as connected to a set of three-phase loading lines 24a, 24b and 24c. The field winding 21 is shown as supplied with direct current from two banks of rectifiers, 23 and 27, in parallel.

Rectifier bank 23, supplying a portion of the exciting current to the field winding 21, is shown as a single-phase full-wave rectifier, though it may also be three-phase, supplied with alternating current from lines 24a and 24b through a current limiting impeder 25 which is shown as inductive, though it may also be capacitive.

Rectifier 27, supplying the rest of the exciting current to the field winding, is shown as a three-phase rectifier supplied with three-phase alternating currents from a three-phase current-transformer bank consisting of three duplicate saturable current-transformers 28, each one associated with one of the load lines and having three windings, a primary winding 28a in series with that line, a secondary winding 28b forming a delta circuit with the other two secondary windings 28b and supplying alternating currents to the rectifier 27, and a saturation control winding 28c connected in series with the other control windings 28c and the control winding 26b of a saturable reactor 26 having an A.-C. coil 26a shunting the A.-C. terminals of rectifier 23. The circuit of these control windings is supplied with direct current from a single-phase rectifier 29 which in its turn is supplied with alternating current from lines 24a and 24b through a voltage sensitive non-linear impeder 30 which is shown as an inductor but which may also be any one of a number of well-known voltage-sensing means.

Two additional parts shown in this figure are a capacitor 22 connected across the field winding 21, and an adjustable resistor 31 connected across the direct-current output terminals of rectifier 29.

These three banks of rectifiers—23, 27 and 29—are of the dry type, also called metallic or solid-state type. So far as the normal full-voltage operation of the machine is concerned, any one of the well-known types of rectifiers will do. However, particularly for rectifier 23, for certainty of starting as explained below, I prefer a germanium rectifier or any other that has as low a forward resistance and as high a backward resistance as the germanium rectifier at very small currents.

The saturable reactor 26 and the saturable current transformer 28 may be constructed in accordance with any one of a number of well-known constructions, and no inventive claim is made here to such structure. However, the primary-to-secondary turn ratio of these current transformers is of controlling interest in the present invention as will be explained below.

The operation of the system is as follows:

The generator field winding 21 has two supplies of exciting current: one shunt, through 23 and 25; and the other series, through 27 and 28. The shunt excitation is seen as forced by the line voltage, the series excitation by the load current.

When the machine is started from rest, with no load on the lines, the armature windings 20, rotating in the magnetic field of the machine, pick up voltage from the residual flux of the machine left over from the previous operation. This residual flux is rendered larger and more dependable by the permanent magnet laminations and by the minimal gap. Those solid-state rectifiers that exhibit a relatively high forward resistance for very small currents and permit relatively high backward currents reduce the likelihood of the machine being able to build up its normal voltage from a residual field, and especially so in the absence of permanent magnet laminations and more so with larger gaps. I have found, for instance, that where a machine would sometimes fail to build up voltage from residual when a selenium rectifier was used for part 23, it would build up voltage unfailingly when a germanium rectifier was substituted for the selenium.

The shunt excitation limiting impeder 25 is so proportioned that, in the absence of control, the no-load voltage of the machine will be substantially higher than the rated value, needing to be reduced to the rated value by the control equipment. This excess capacity is helpful in building up voltage from residual, in supporting overload surges, and also in reduced speed operation.

The control at no load is accomplished as follows.

The saturable reactor winding 26a, connected across the input terminals of rectifier 23, tends to divert a portion of the current furnished to 23 by lines 24a and 24b through impeder 25. The fraction of current so diverted from 23 to 26a depends on the degree of saturation of reactor 26. This saturation is controlled through the control winding 26b supplied with control current from rectifier 29 which is supplied from lines 24a and 24b through the voltage-sensing non-linear impeder 30. If the load voltage is too high, a greatly increased current flows through the non-linear impeder 30 into the rectifier 29, and a correspondingly increased rectified current flows into the control winding 26b, saturating the reactor 26 and enabling 26a to divert more current from rectifier 23 so as to reduce the exciting current flowing from 23 into the field winding 21. Conversely, if the line voltage is too low, the current flowing through 30 diminishes sharply, reducing the control current in 26b, increasing the reactance of 26a, and so reducing the current diverted from 23 and 21. Thus the desired voltage is maintained on the lines.

As load current comes on, and currents flow through the primary windings 28a of the current transformers, corresponding alternating currents tend to be induced in the secondary windings 28b, and the resultants of these currents flow into the rectifier 27; and from 27 corresponding rectified currents flow into the field winding 21.

Full turn-ratio secondary currents are induced in the current transformer secondary windings 28b only when the current transformer is not saturated at all, and less and less is induced with increasing saturation. An excess of voltage on the lines causes an increased supply of control current, increasing the saturation of the current transformers; and this reduces the induced currents in the secondary windings, reducing thereby the flow of series excitation to the field winding 21. Conversely, an undervoltage on the lines results in an increased flow of series excitation flowing into the field winding 21.

As the control windings 28c and 26b are in series, the same control current flows in both of them and controls them simultaneously. The exact division of control effect between 26 and 28 is not important provided that both of them are controllable through their complete range.

The current transformer ratio, between the turns of the primary windings 28a and those of the secondary windings 28b, according to the present invention, is determined by the following principles and considerations.

Conventionally, the current transformer ratio is made such as to deliver to the field winding an increment of excitation fully adequate to compensate for the reduction in voltage that would otherwise be caused by the load current at its maximum rated load at a specified power factor, such as full rated load at 80% lagging power factor. As the reactive component of such a load is 60%, and the demagnetizing effect of this component is the major cause of loss of voltage under load, it follows that the provision for an increment of field excitation equal to this in terms of effective ampere turns per pole will take care of this need; and if the provision is made for 75% (instead of 60%), then ample margin will be provided to meet the standard guarantees on the machine. Thus conventional standards are met by making provision for incremental field ampere-turns per pole a great deal less than the effective armature ampere turns per pole. According to the present invention, however, the provision under consideration would be several times as much and it would be reasoned as follows.

In the range of the maximum rated regulated-voltage load, no substantial excess exciting current can flow into the field winding regardless of the current transformer ratio, any excess being checked by the regulating equipment to prevent the overvoltage that would otherwise result on the lines. However, any available excess excitation comes into play under overload conditions when the line voltage dips below normal. When a highly fluctuating load calls for a large surge of overload current, whether or not it will be delivered depends on whether or not the system is able to deliver to the machine a corresponding large surge of field excitation. If the excitation supplied is inadequate in magnitude or too slow in building up, the load—most likely a motor—may stall and fuses may blow or breakers may trip. But if adequate and fast, the motor pulls over any hump within its speed-torque curve and then its current becomes normal once more. As such surges are of very short duration, they require little additional current carrying capacity in the armature and the field windings.

As a majority of such load surges are found to lie between 200% and 300% of the rated current of the machine, it is a concern of the present invention to provide a synchronous alternator system capable of delivering overload current surges in this range with the load voltage maintained at a high fraction, such as better than 90 percent of its rated value. This is accomplished primarily by high gain current transformers and by saturation, without loss of stability, as will now be explained.

As the armature and the field windings generally have very different number of turns, it will be helpful in this exposition to correlate the field and the armature currents as follows.

Let $I_{aN}$ be the normal rated armature-terminal current of the machine, and let this be held during the well-known short-circuit test of the machine. Let $I_{faN}$ be the field current that is found necessary to produce the $I_{aN}$. Then this $I_{faN}$ represents or is equivalent to the magnetizing effect of $I_{aN}$ and opposite to it, and may be though of as 100 percent—in terms of the armature ampere-turns—and other values of the field current may be expressed in proportionate percentage values.

As the reactive component of the armature current in the short circuit test is practically 100 percent, and as it is the reactive component of any given load current $I_a$ that is primarily responsible for the loss of voltage of the machine under load, the minimum increment of field current, $\Delta I_f$, necessary to prevent such loss of voltage is given approximately by $$\Delta I_f = I_{faN} \frac{I_a}{I_{aN}} \times \text{load reactive factor}$$

Actually a somewhat higher field increment of current will be necessary so as to overcome also the resistance drop and the quadrature reactance drop of the armature.

Let $I_{fo}$ be the no-load field current necessary to develop the rated voltage of the machine. This can be either the actual value observed in test or the value taken from the straight line extension of the open circuit curve of the machine. These two values need not be far apart. Taking the latter value, $100I_{faN}/I_{fo}$ represents the percent synchronous impedance of the machine. In a conventional machine, this is of the order of 100 percent, and in the present invention of the order of 200 percent. This implies that if the field excitation is adjusted properly at no load and maintained at that value, and then a short circuit is applied to the armature terminals, the steady-state short-circuit current output of the machine will be only 50 percent of its rated full load current, as has also been verified by test. These machines, however, when incorporated into the system of the present invention will deliver triple rated current at better than 90 percent of the rated voltage, as has also been verified by test. As the major factors in this performance are the high-gain current transformers and saturation mentioned above, these will now be explained.

As a reference yardstick, we shall establish first the normal-gain current transformer. This is a current transformer that delivers to the field winding through rectifiers a percentage current equal to the sum of the reactive component of the rated full load current at its rated power factor and such additional current as is necessary to overcome the loss of voltage due to resistance drop and quadrature reactance drop. As noted above, standard guarantees generally call for 80 percent power factor, and this implies 60 percent reactive factor, and it follows that the current transformers must be able to deliver to the field winding an increment of field current, $\Delta I_f$, equal to 60 percent of the $I_{faN}$ defined above plus an allowance for the lesser losses of voltage mentioned above. With such allowance, it may be said that a current transformer capable of delivering to the field winding a maximum of 75 percent incremental current constitutes a normal-gain current transformer. To see what this means in terms of the normal no-load field current of the machine, it may be remarked first that in a machine of 200 percent synchronous impedance, the field current will be about 50 percent, and with the increment added, 125 percent. Changing the base of percentages from the armature to the field winding, this means 250 percent of the normal no-load field current. The normal-gain current transformer then will be able to deliver to the field winding a current equal to 150 percent of the no-load field current.

Such a machine cannot deliver a 300 percent surge of load current. To be able to do this, the current transformers must be able to deliver to the field winding 300–400 percent current (on the armature base) which is 4–5 times the gain of the normal-gain current transformer bank. The 300 percent figure is based on the recognition that such overloads are apt to have a high reactive component, and the additional percentage is allowance for the lesser losses of voltage and to raise the air-gap flux density and to saturate the core.

While this great increase in the current transformer gain does not imply a corresponding increase in its current carrying capacity due to short duration, it does imply the availability of sufficient voltage to the current transformers to enable them to deliver to the field winding such surges of excitation.

Although the calculations given above are greatly simplified approximations, they are fully adequate to establish the orders of the large ratios indicated above.

Allusion was made above to the prompt response of the excitation system to overload surges. One of the factors in this is the capacitor 22 across the field winding 21. A sudden overload tends to demagnetize the field suddenly. This is resisted by the field winding, its current tending to rise suddenly so as to neutralize the demagnetizing effect of the load current. But this rise of current encounters all of the impedances—inductances and resistances—in series with the field winding. These slow up the rise of the current, they reduce the crest when it does rise, and tend to damp out the transient. But with a large capacitor connected across 21, the field current can rise instantaneously to large values, and the larger this capacitance the longer this current can be sustained. Of course, as this current charges the capacitor, a counter voltage is progressively built up reducing the current flowing into the capacitor. But it is not necessary that the capacitor carry this current indefinitely. The voltage regulating equipment is in action and will not only take over this current progressively but will also add to it to make up for other losses of voltage. The capacitor improves the speed of response of the machine to surges, momentarily, increasing its rigidity to maintain its voltage.

Considering now the degree of accuracy of the output voltage of the system, this can be improved either by in- increasing the gain of the current transformers or that of the voltage-sensitive control equipment; and it may appear as commonsense to increase both of them so as to obtain a superior constant-potential system. Such attempts, however, will be found to lead to instability, the output voltage ceaselessly oscillating above and below the desired value. In the present invention this problem is solved as follows: Design the current transformers for a gain that will supply approximately triple rated current at a major fraction of the rated voltage. After this is done, adjust the gain of the voltage-sensitive control equipment to a point just safely below the unstable condition. This implies that the full-load voltage of the system will be slightly above the no-load voltage. This difference, however, is in general well within the commercial tolerances.

In FIG. 2 the shunt and the series excitation systems are paralleled at their direct-current output terminals, each system having its own rectifier and control, while in the modification shown in FIG. 3 these two excitation systems are paralleled at their alternating-current output terminals, saving one rectifier and its associated control, though now the current transformers and the associated rectifier bank are larger. Thus, it will be seen that the rectifier 23 and the associated control reactor 26 are absent from FIG. 3, rectifier 27 serving the alternating current outputs of both 25 and 28. When necessary, and to the extent that it may be necessary, the alternating current output of 25 is diverted from 27 into the circuit of the secondary windings 28b of the current transformers. Otherwise, FIGS. 2 and 3 are alike.

Having described and explained the principles, organization and mode of operation of my synchronous alternator system, I claim as my invention:

1. A self-exciting and self-regulating stable synchronous alternator system adapted to supply a highly fluctuating load, said system having a normal regulated voltage and a maximum continuous load current capacity at said voltage and adapted to supply for a short time a sudden surge of overload current several fold of said maximum current at a voltage of the order of said normal voltage; said system including a synchronous alternator having a magnetic circuit and a direct current exciting winding for said circuit, said magnetic circuit having a stationary member and a rotating member within said stationary member, said stationary and rotatable magnetic members having adjacent surfaces forming an air gap therebetween of a dimension substantially the minimum required for mechanical and working clearance, said magnetic circuit including laminated magnetic poles on one of said members, said direct current exciting winding being carried by said one member and surrounding said magnetic poles for supplying direct current excitation to said poles, an alternating current output winding means carried by the other of said members, a small fraction of the laminations of said poles consisting of high coercive force magnetic material to assure a high residual flux in said gap when said generator is shut down, the rest of said laminations consisting of high permeability low coercive force magnetic material to assure of building up a high operating flux in said gap when said alternator is put back into service, said laminations of high coercive force magnetic material and low coercive force magnetic material being stacked in closely assembled directly abutting relation to each other in said poles, and excitation current supply means deriving its power from said alternator and connected to said exciting winding for magnetically saturating said circuit under overload conditions to reduce the synchronous impedance of said alternator and thereby permit said alternator to deliver a large overload current at approximately normal voltage.

2. An electrical generator comprising a stationary magnetic member and a rotatable magnetic member mounted for rotation within said stationary member, said stationary and rotatable magnetic members having adjacent surfaces forming an air gap therebetween of a dimension substantially the minimum require for mechanical and working clearance, a laminated magnetic pole on one of said members, a small fraction of the laminations of said pole consisting of high coercive force magnetic material to assure of a high residual flux in said gap when said generator is shut down, the rest of the laminations of said pole consisting of high permeability low coercive force magnetic material, said laminations of high coercive force magnetic material and low coercive force magnetic material being stacked in closely assembled directly abutting relation to each other in said pole, a direct current excitation winding carried by said one member, and electrical output winding means carried by the other of said members.

3. A self-exciting electrical generator comprising a magnetic core including a stationary magnetic member and a rotatable magnetic member mounted for rotation within said stationary member, said stationary and rotatable magnetic members having adjacent surfaces forming an air gap therebetween of a dimension substantially the minimum required for mechanical and working clearance, laminated magnetic poles in one of said members, a small fraction of the laminations of the respective poles consisting of high coercive force magnetic material to assure of a high residual flux in said gap when said generator is shut down, the rest of said laminations consisting of high permeability low coercive force magnetic material, said laminations of high coercive force magnetic material and low coercive force magnetic material being stacked in closely assembled directly abutting relation to each other in the respective poles, a direct current excitation winding carried by said one member having said magnetic poles, electrical output winding means carried by the other of said magnetic members for delivering an output voltage, said direct current excitation winding means being energized from said electrical output winding means.

4. A self-exciting alternating current electrical generator comprising a magnetic core including a stationary magnetic member and a rotatable magnetic member mounted for rotation within said stationary member, said stationary and rotatable magnetic members having adjacent surfaces forming an air gap therebetween of a dimension substantially the minimum required for mechanical and working clearance, laminated magnetic poles in one of said members, a small fraction of the laminations of the respective poles consisting of high coercive force magnetic material to assure of a high residual flux in said gap when said generator is shut down, the rest of said laminations consisting of high permeability low coercive force magnetic material, said laminations of high coercive force magnetic material and low coercive force magnetic material being stacked in closely assembled directly abutting relation to each other in the respective poles, a direct current excitation winding carried by said one member having said poles, and alternating current output winding means carried by the other of said magnetic members, and rectifier means connecting said direct current excitation winding means to said alternating current output winding means.

5. An alternating current generator system adapted to supply heavy transient overload surge currents with good voltage regulation comprising an alternating current generator including a magnetic core having a stationary magnetic member and a rotatable magnetic member mounted for rotation within said stationary member, an alternating current output winding carried by one of said members, said stationary and rotatable magnetic members having adjacent surfaces forming an air gap therebetween of a dimension substantially the minimum required for mechanical and working clearance, the other of said magnetic members including an excitation field means for supplying direct current excitation to said generator, both said stationary and rotatable magnetic members being of laminated magnetic material, a small fraction of the laminations of said one magnetic member being high coercive force magnetic material, said excitation field means including a field winding, supply means for supplying direct current excitation to said field winding, and means for controlling the excitation current provided by said supply means in response to current and voltage output of said generator to regulate the voltage output of said generator.

6. An alternating current generator system as defined in claim 5 in which said alternating current generator is self-exciting and said field winding is connected to the output of said generator through rectifier means.

7. A regulating system for a three-phase alternating current dynamo-electric machine comprising, an armature circuit having a three-phase output, a field winding, a first rectifier for supplying direct current to said field winding, first and second means for supplying alternating current energy from said armature circuit to said first rectifier, said first means including current transformers in the output of said armature circuit for supplying alternating current energy to said first rectifier proportional to the current of said armature circuit, a direct current saturating winding for said current transformer, a second rectifier connected to said armature circuit, said second rectifier being connected to said saturating winding and supplying direct current thereto responsive to changes in armature circuit voltage, said second means for supplying alternating current energy from said armature circuit to said first rectifier including conductor means directly connecting terminals of said first rectifier in series with a reactor means across two lines of the three-phase output of said armature circuit, one of said current transformers being connected across said terminals of said first rectifier, said one current transformer being connected in a line of said three-phase output which is out of phase with the energy supplied by said second means to said first rectifier.

8. A regulating system as defined in claim 7 in which said second rectifier is connected to said armature circuit in series with a non-linear impedance element.

References Cited in the file of this patent

UNITED STATES PATENTS

| | | |
|---|---|---|
| 473,367 | Short | Apr. 19, 1892 |
| 1,311,542 | Turbayne | July 29, 1919 |
| 2,066,919 | West | Jan. 5, 1937 |
| 2,134,880 | McDowell et al. | Nov. 1, 1938 |
| 2,190,756 | Moyer | Feb. 20, 1940 |
| 2,371,030 | Crary | Mar. 6, 1945 |
| 2,422,626 | Tolson et al. | June 1, 1947 |
| 2,423,345 | Roters | July 1, 1947 |
| 2,451,954 | Johns | Oct. 19, 1948 |
| 2,454,582 | Thompson et al. | Nov. 23, 1948 |
| 2,525,404 | Dolan | Oct. 10, 1950 |
| 2,540,202 | Haas | Feb. 6, 1951 |
| 2,547,599 | Roters | Apr. 3, 1951 |
| 2,558,572 | Logan | June 26, 1951 |
| 2,564,320 | Brainard | Aug. 14, 1951 |
| 2,719,259 | Miner | Sept. 27, 1955 |
| 2,768,344 | McKenna | Oct. 23, 1956 |

FOREIGN PATENTS

| | | |
|---|---|---|
| 315,045 | Great Britain | July 11, 1929 |
| 325,056 | Great Britain | Feb. 13, 1930 |
| 446,790 | Great Britain | May 6, 1936 |